United States Patent [19]

Palm

[11] 4,249,625
[45] Feb. 10, 1981

[54] DRIVE SYSTEM FOR CRAWLER PROPELLED MACHINES

[75] Inventor: Michael M. Palm, Marion, Ohio

[73] Assignee: Dresser Industries, Inc., Dallas, Tex.

[21] Appl. No.: 21,802

[22] Filed: Mar. 19, 1979

[51] Int. Cl.³ .................. B62D 11/08; B62D 55/12
[52] U.S. Cl. ............................... 180/6.7; 180/6.58
[58] Field of Search ............... 180/6.7, 6.2, 6.58; 74/665 T

[56] References Cited

U.S. PATENT DOCUMENTS

| | | | |
|---|---|---|---|
| 2,281,288 | 4/1942 | Hettelsater | 180/6.58 |
| 2,757,746 | 8/1956 | Biedess | 180/6.7 |
| 2,791,918 | 5/1957 | Frellsen | 180/6.7 |
| 3,171,504 | 3/1965 | Noll et al. | 180/6.58 |
| 3,460,645 | 8/1969 | Brown et al. | 180/6.7 |
| 3,580,345 | 5/1971 | Brown et al. | 180/6.7 |

Primary Examiner—John J. Love
Assistant Examiner—Donn McGiehan
Attorney, Agent, or Firm—Ward, Lalos, Leeds, Keegan & Lett

[57] ABSTRACT

A drive system for crawler propelled earth working machinery is described. A first clutch which is movable between a drive position for transmitting drive from a drive source to a first drive sprocket and a lock position for locking the first drive sprocket to the frame is provided. A second clutch permits a second drive sprocket to free wheel. The second clutch has a drive position for transmitting drive from the drive source to the second drive sprocket and a lock position for locking the second drive sprocket to the frame. The first drive sprocket is, as well, lockable to the frame. The foregoing locking arrangements are selectively engageable with the first and second drive sprockets. Hydraulically actuatable shifting devices shift the first clutch between drive and lock positions and the second clutch between free wheel, drive and lock positions. A shifting preventing device releasable responsive to engagement of one of the drive sprocket locking devices prevents the second clutch from shifting to the free wheel position.

16 Claims, 10 Drawing Figures

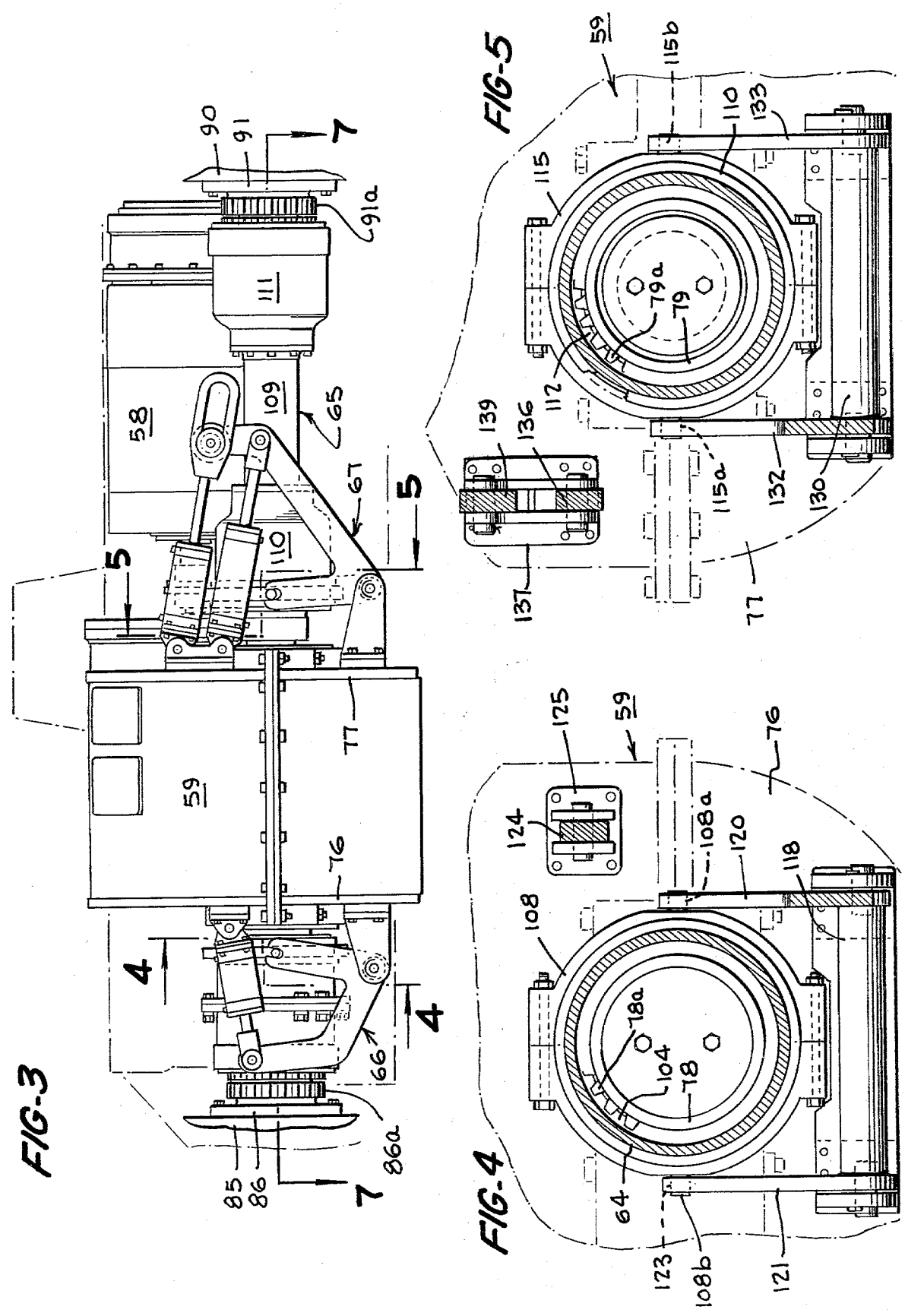

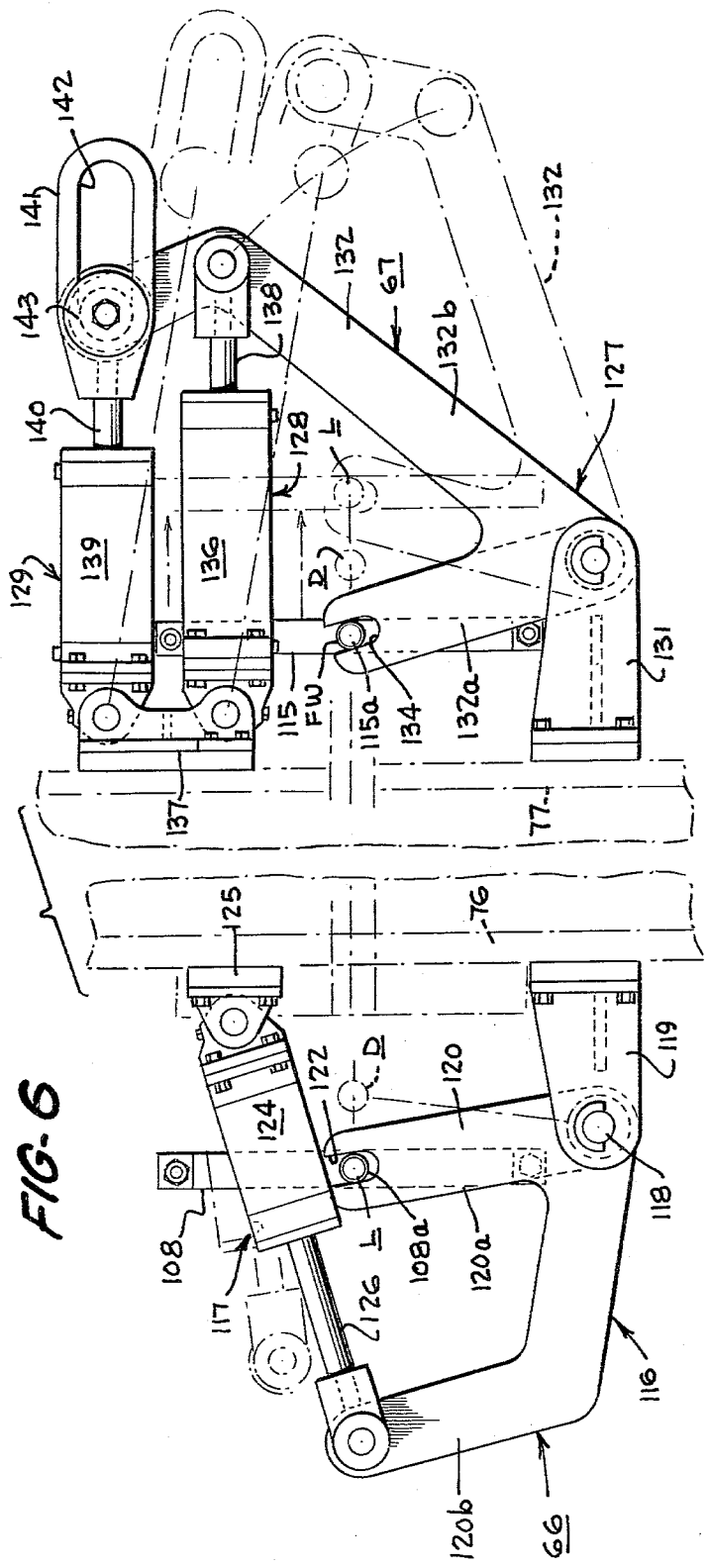
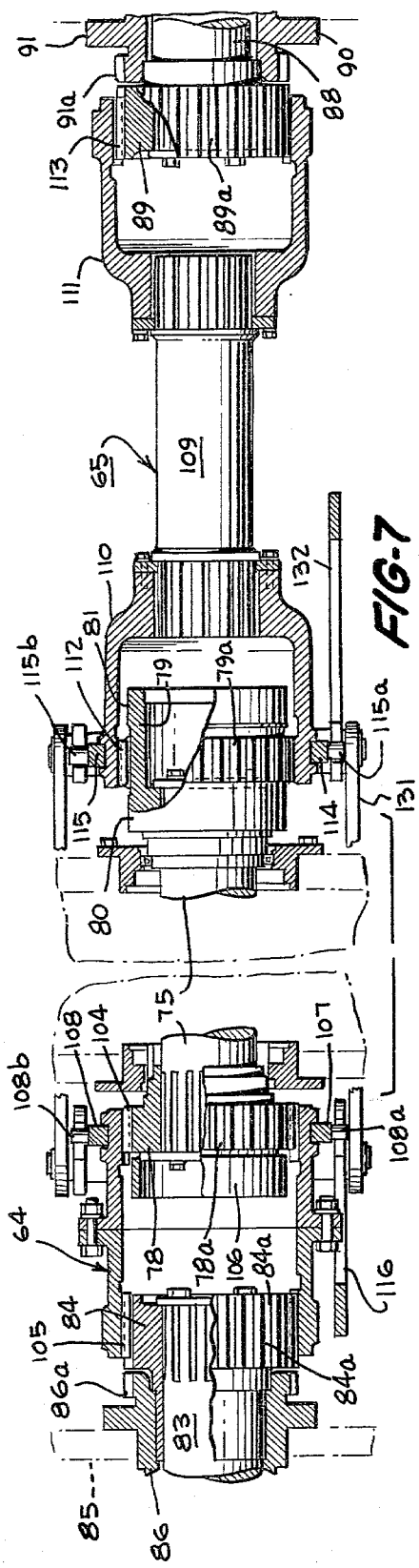

DRIVE SYSTEM FOR CRAWLER PROPELLED MACHINES

This invention relates to a drive system and more particularly to a drive system for an earth working, crawler propelled machine.

Conventional heavy-duty crawler propelled machines such as mining shovels, blast hole drills and the like normally are provided with drive systems which are operable to place the machine in propelling, steering or operating modes. When the machine is in the operating mode, the crawlers are locked to prevent the machine from shifting. In the prior art, to place the machine in a steering mode, it was possible to place the drive sprockets in a free wheel condition. Such requirement has been found to be undesirable in that it places the machine in a potentially uncontrolled, run-away condition which could result in damage to the machine and other property or injury to operating personnel.

Accordingly, it is the principal object of the present invention to provide an improved drive system for crawler propelled machines.

Another object of the present invention is to provide an improved drive system for earth working, crawler propelled machines which is adapted to place the machine in propelling, steering and operating modes.

A further object of the present invention is to provide an improved drive system for earth working, crawler propelled machines which is operable to prevent the machine from ever being in the totally free wheel condition.

A still further object of the present invention is to provide an improved drive system for an earth working, crawler propelled machine which is comparatively simple in design, relatively inexpensive to manufacture, highly effective in performance and readily serviceable.

Other objects and advantages of the present invention will become more apparent to those persons having ordinary skill in the art to which the present invention pertains from the following description taken in conjunction with the accompanying drawings wherein:

FIG. 3 is an enlarged cross-sectional view taken along line 3—3 in FIG. 1;

FIG. 4 is an enlarged cross-sectional view taken along line 4—4 in FIG. 3;

FIG. 5 is an enlarged cross-sectional view taken along line 5—5 in FIG. 3;

FIG. 6 is an enlarged elevational view of the shifting levers of the embodiment of the invention shown in FIGS. 1 through 5, illustrating different positions of such levers;

FIG. 7 is an enlarged cross-sectional view taken along line 7—7 in FIG. 3;

Figure 1:
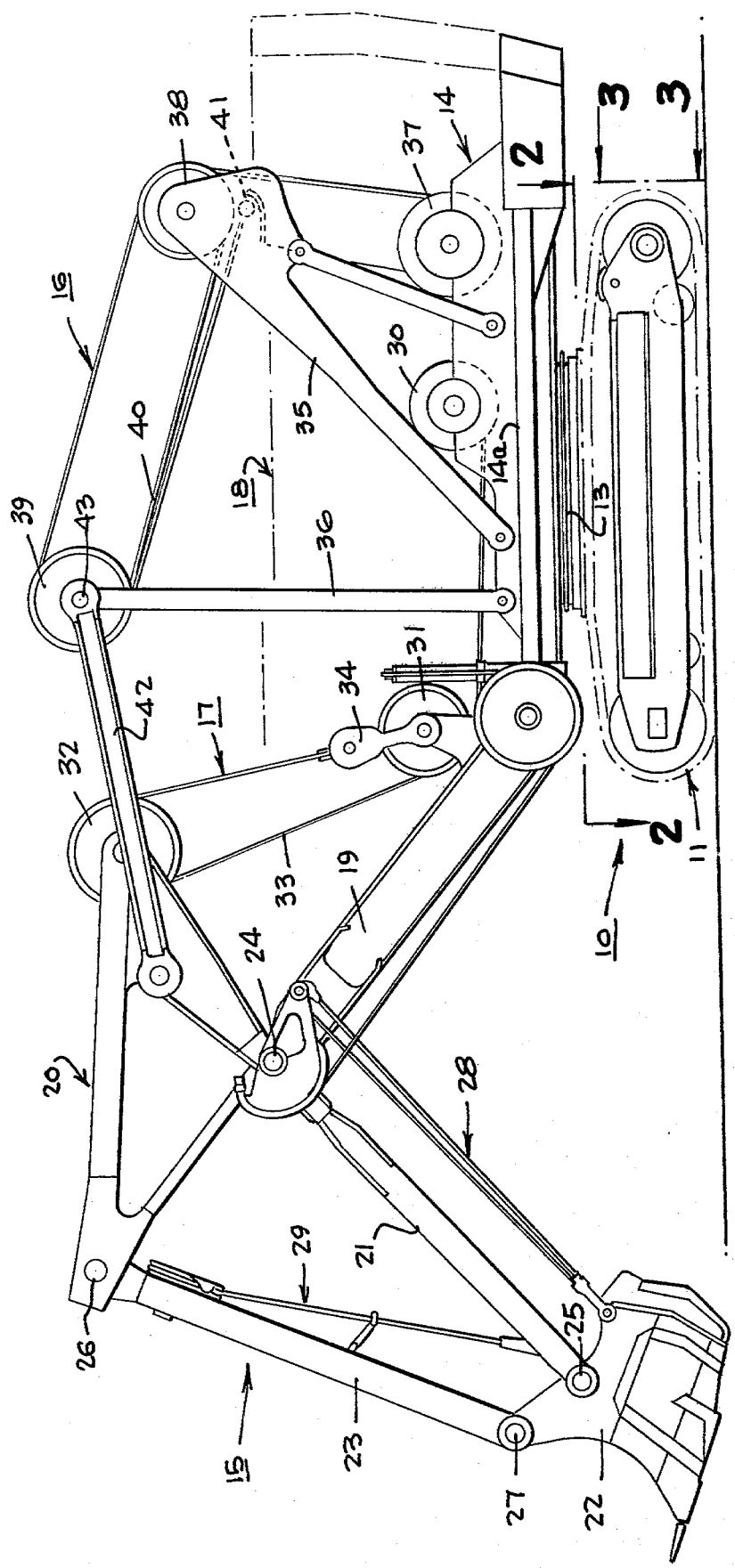
FIG. 1 is a side elevational view of a power shovel incorporating an embodiment of the present invention.

Referring to FIG. 1 of the drawings, there is illustrated a power shovel utilizing an embodiment of the present invention. The machine generally comprises a lower works construction 10 supported on a pair of crawler mechanisms 11 and 12, a live roller circle 13 mounted on the lower works construction, an upper frame 14 having a main deck 14a rotatably supported on the roller circle, a front end assembly 15 mounted on the front end of the upper frame, a crowd system 16 mounted on the main deck and operatively connected to the front end assembly, a hoist system 17 mounted on the front end assembly and appropriate machinery and controls mounted on the main deck for operating the crowd and hoist systems. A housing 18 also is mounted on the main deck which encloses certain structural components, the swing and propulsion machinery of the shovel and other auxiliary systems and equipment.

Front end assembly 15 generally includes a stiffleg 19, a hoist frame 20, a dipper handle 21, a dipper 22 and a hoist link 23. Stiffleg 19 consists of a structural member pivotally connected at its lower end to the front end of upper frame 14 and is provided at its upper end with a head shaft 24. Hoist frame 20 is pivotally mounted on head shaft 24. Dipper handle 21 consists of a suitable structural member and is provided with upper and lower bifurcated ends. The upper bifurcated end is connected to the hoist frame by means of a pair of connecting pins. The lower bifurcated end of the dipper handle is pivotally connected to the upper rear end of dipper 22 by means of a pair of axially aligned pins 25. The forwardly disposed head section of the hoist frame and the upper front end of the dipper are connected by hoist link 23. The upper end of the hoist link is connected to a bifurcated portion of the head section of the hoist frame by means of a connecting pin 26. The lower bifurcated end of the hoist link is connected to the dipper by means of a pair of axially aligned pins 27. It thus will be seen that hoist frame 20, dipper handle 21, dipper 22 and hoist link 23 are pivotally connected together to provide a four-bar linkage with the link comprising the hoist frame being pivotally connected to the upper end of the stiffleg by means of head shaft 24.

To provide a substantially flat pass of the dipper when it is crowded into a bank of material being excavated or loaded, there is provided on the front end assembly a pitch control system 28, the construction and operation of which is fully described in U.S. Pat. Nos. 3,501,034 and 3,648,863. In addition, the front end assembly is provided with a pitch stop assembly 29, the construction and operation of which is fully described in U.S. Pat. No. 4,085,854.

Hoist system 17 generally includes a hoist drum 30, sheaves 31 and 32 and a hoist line 33. Hoist drum 30 is mounted on main deck 14a of the machine and is driven by an electric motor through a gear train also mounted on the main deck. Sheave 31 is mounted on the lower end of stiffleg 19 in longitudinal alignment with hoist drum 30. Sheave 32 is mounted on an upper, rearward end of hoist frame 20. As illustrated in FIG. 1, hoist line 33 is wound on hoist drum 30, extends forwardly and around sheave 31, extends upwardly and around sheave 32 and extends downwardly and is connected to a bail 34 mounted on the mounting shaft of sheave 31. It further will be seen that by operating hoist drum 30 to pay out and take in hoist line 33, hoist frame 20, dipper handle 21 and hoist link 23 will be caused to pivot about head shaft 24 to correspondingly hoist and lower the dipper.

Crowd system 16 consists of a gantry 35, a mast 36, a drum 37 sheaves 38 and 39 and a crowd rope 40. Gantry 35 is mounted on the main deck along the longitudinal center line of the machine. Mast 36 consists of a structural member pivotally connected at its lower end to brackets secured to the main deck, forwardly of the vertical center line of roller circle 13. Crowd drum 37 is mounted on a frame secured to the main deck, rearwardly of hoist drum 30. Similarly to hoist drum 30, crowd drum 37 is driven by an electric motor mounted on the main deck, through a gear train also mounted on the main deck. Sheave 38 is mounted on the upper end of the gantry, substantially above crowd drum 37. Sheave 39 is mounted on the upper end of mast 36 substantially in longitudinal alignment with sheave 38. Crowd rope 30 is wound on crowd drum 37, extends upwardly and is reeved about sheaves 38 and 39 and is connected at the opposite end thereof to a bail 14 mounted on the upper end of the gantry adjacent sheave 38. A crowd link 42 is pivotally connected at the ends thereof to hoist frame 20 and a shaft 43 mounted on the upper end of the mast so that pivotal motion of the mast in a vertical plane will be transmitted by crowd link 42 to the front end assembly of the machine. It will be appreciated that by paying out and taking in crowd rope 40 mast 36 will be caused to pivot in a vertical plane and that such motion will be transmitted to the front end assembly through crowd link 42 to raise and lower the front end assembly.

Figure 2:
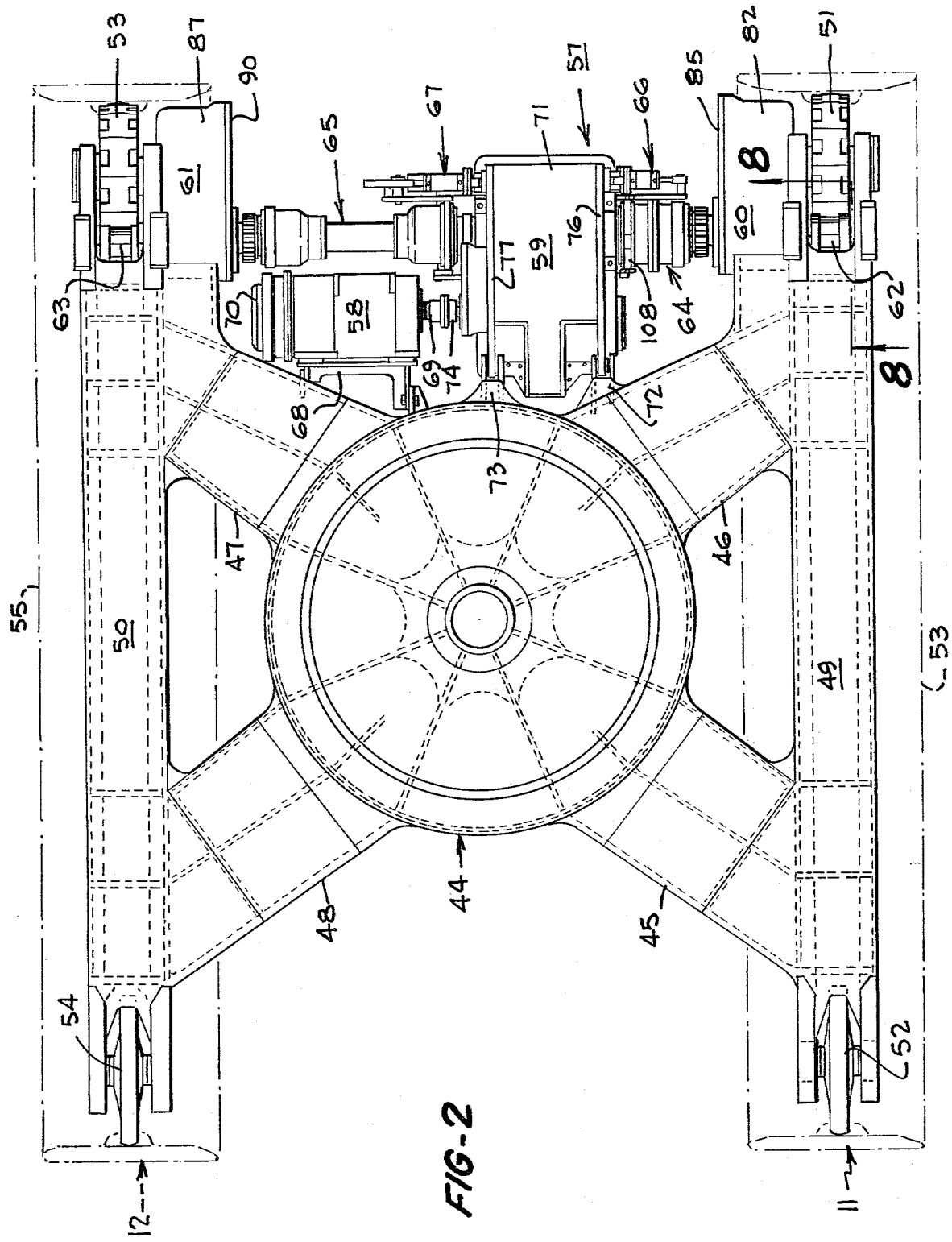
FIG. 2 is an enlarged cross-sectional view taken along line 2—2 in FIG. 1.

Referring to FIG. 2, lower works construction 10 consists of a lower frame section 44, a plurality of laterally projecting leg sections 45 through 48 rigidly secured to the sides of the lower frame section, a crawler frame section 49 mounted on the ends of leg sections 45 and 46 and supported on crawler mechanism 11, and a crawler frame section 50 rigidly mounted on the outer ends of leg sections 47 and 48 and supported on crawler mechanism 12. Crawler mechanism 11 consists of a drive sprocket 51 journaled in the rear end of crawler frame section 49, an idler roller 52 journaled in the front end of crawler frame section 49 and a crawler tread 53 engageable with sprocket 51 and roller 52. Crawler mechanism 12 is similar in construction to crawler mechanism 11 and consists of a drive sprocket 53 journaled in the rear end of crawler frame section 50, an idler roller 54 journaled in the front end of crawler frame section 50 and a crawler tread 55 supported on and engageable with sprocket 53 and roller 54. Sprockets 51 and 53, are of a conventional construction having circumferentially spaced recesses which receive and engage lugs on the crawler treads for transmitting drive to the treads.

Crawler mechanisms 11 and 12 are driven by a drive assembly 57 basically consisting of a motor 58, a main gear reduction unit 59, final gear reduction units 60 and 61, sprocket locking assemblies 62 and 63, clutch assemblies 64 and 65 and clutch shifting assemblies 66 and 67.

As best seen in FIG. 2, motor 58 is mounted on a bracket 68 rigidly secured to the rear end of lower frame section 44 and leg section 47. The motor is provided with an output shaft 69 and a brake 70 at the opposite end thereof. When the machine is not in service, brake 70 is normally applied. However, during all operating modes of the machine, the brake is in the released condition. Gear reduction unit 59 consists of a housing 71 mounted on brackets 72 and 73 formed on the rear end of lower frame section 44 and leg section 46, containing a gear train including an input shaft 74 coupled to motor output shaft 69 and an output shaft 75 having the free ends thereof projecting laterally through openings provided in side walls 76 and 77 of the gear housing. As best shown in FIG. 7, gear box output shaft 75 is provided with a clutch member 78 on one end thereof, provided with a set of splines 78a, and a clutch member 79 mounted on the opposite end thereof, provided with a set of splines 79a positioned between two land surfaces 80 and 81. It will be appreciated that when brake 70 has been released and motor 58 has been energized, torque will be transmitted through coupled shafts 69 and 74 and the gear train in housing 71 to output shaft 75.

Final gear reduction unit 60 consists of a housing 82 mounted on the inner, rear end of crawler frame section 49, and a gear train having an input shaft 83 and an output shaft drivingly connected with sprocket 51. As best shown in FIG. 7, input shaft 83 is disposed in coaxial alignment with output shaft 75 and is provided with a clutch member 84 having a set of splines 84a. Input shaft 83 extends through an opening on inner wall 85 of housing 82 and an annular clutch member 86 which is rigidly secured to housing wall 85 and is provided with a set of splines 86a. Final gear reduction unit 61 is similar in construction and function to final gear reduction unit 60. It consists of a housing 87 rigidly mounted on the inner, rearward end of crawler frame section 50, containing a gear train having an output shaft drivingly connected to drive sprocket 53 and an input shaft 88 disposed in coaxial alignment with output shaft 75. Input shaft 88 is provided with a clutch element 89 having a set of splines 89a. Input shaft 88 projects through an opening in a side wall 90 of gear housing 87 and an annular clutch member 91 rigidly secured to housing wall 90 and being provided with a set of splines 91a aligned axially with splines 89a of clutch member 89.

Figure 8:
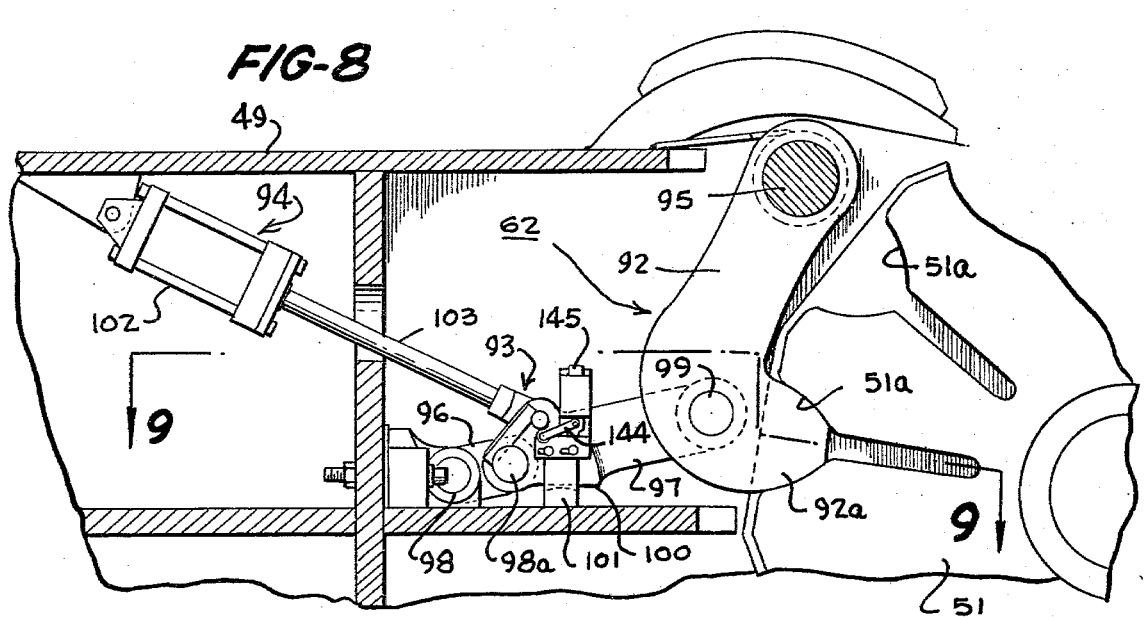
FIG. 8 is an enlarged cross-sectional view taken along line 8—8 in FIG. 2, illustrating a locking lug in a sprocket engaging position.
Figure 9:
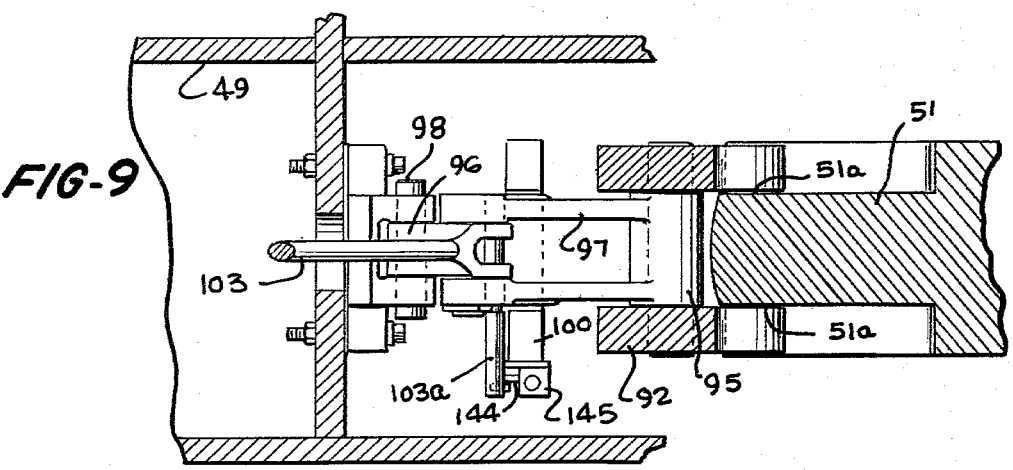
FIG. 9 is a cross-sectional view taken along line 9—9 in FIG. 8.
Figure 10:
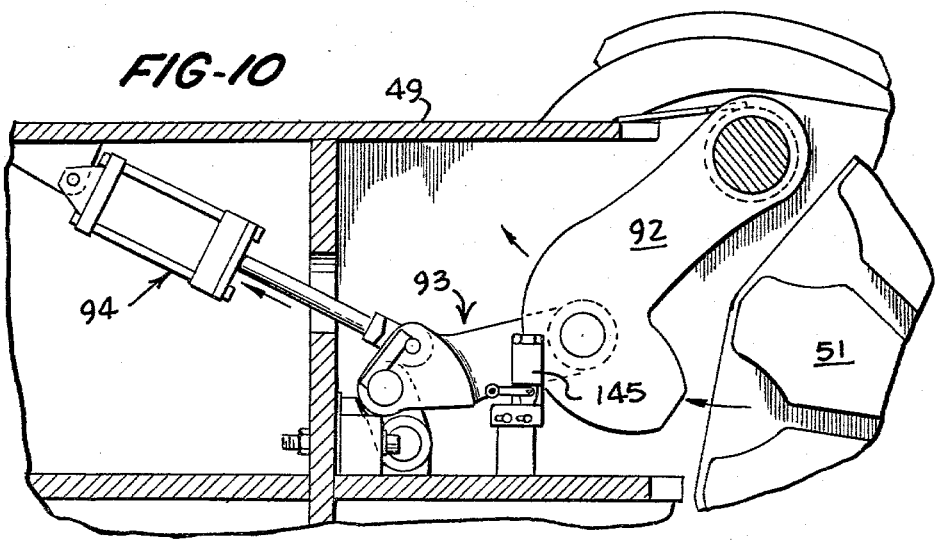
FIG. 10 is a view similar to the view of FIG. 8, illustrating the locking lug in a disengaged position.

Sprocket locking assemblies 62 and 63 also are substantially similar in construction and function. Referring to FIG. 8, it will be seen that such assembly consists of a pivotal locking lug 92, a linkage 93 and a fluid cylinder assembly 94. Lug 92 is pivotally mounted at the upper end thereof to a transversely disposed pin 95 rigidly mounted on the upper rear end of crawler frame section 49, adjacent sprocket 51. Lug 92 is provided with a rearwardly projecting portion 92a which is receivable within circumferentially spaced recesses 51a provided on the periphery of drive sprocket 51 to lock the drive sprocket. Linkage 93 consists of a pair of links 96 and 97. Link 96 is pivotally connected to the crawler frame section by means of a pin 98. Link 97 is pivotally connected to link 96 and lug 92 by means of pins 98a and 99. The linkage is prevented from collapsing in a downward direction by means of an abutment portion 100 which engages a stop element 101 provided on the crawler frame section. Fluid cylinder assembly 94 includes a cylinder 102 pivotally connected to the crawler frame section and a rod 103 pivotally connected at its outer end to link 97. It will be appreciated that when fluid under pressure is supplied to the piston end of cylinder 102, rod 103 will be extended to urge links 96 and 97 into alignment and lug projection 92a into engagement with the periphery of sprocket 51 and into a recess 51a of the sprocket when such recess registers with protruding lug portion 92a. When fluid under pressure is supplied to the rod end of cylinder 102, it will be appreciated that linkage 93 will be caused to collapse upwardly, withdrawing the protruding lug portion from the recess in the drive sprocket thus releasing the sprocket and permitting it to rotate.

Clutch member 64 consists of a shaft supported on clutch members 78 and 84 and is provided with splined sets 104 and 105. It is displaceable axially by shifting assembly 66 so that when it is in a drive transmitting position D, as illustrated in FIGS. 6 & 7, splines 104 will engage splines 78a of clutch member 78 and splines 105 will engage splines 84a of clutch member 84, and when it is in a lock or steer right position L, splines 104 will disengage splines 78a and rest on annular support member 106 and splines 105 will engage both splines 84a of clutch member 84 mounted on input shaft 83 and splines 86a of clutch member 86 rigidly secured to side wall 85 of gear housing 60. Splines 86a are positioned sufficiently close to splines 84a so that as clutch member 64 is shifted from the drive position to the lock position, splines 105 will engage splines 86a before splines 104 completely disengage with splines 78a. Clutch member 64 further is provided with an annular recess 107 in which there is mounted a shifting collar 108.

Clutch assembly 65 consists of a shaft 109 disposed coaxially with output shaft 75 and input shaft 88 and a pair of clutches 110 and 111 mounted on the ends thereof. Inner clutch member 110 consists of a bell-type housing which receives and is supported on clutch member 79. It is provided with a set of internal splines 112 which are adapted to engage splines 79a of clutch member 79 or rest on lands 80 and 81 to either side of splines 79a. Outer clutch member 111 also consists of a bell-type housing which receives and is supported on clutch member 89. It is provided with a set of internal splines 113 which engage splines 89a of clutch member 89 mounted on input shaft 88. Clutch assembly 65 is displaceable axially between lock, drive and free wheel positions L, D and FW by shifting assembly 67. The clutch assembly is shown in the drive position in FIG. 7 with splines 112 engaging splines 79a of clutch member 79 mounted on output shaft 75, and splines 113 engaging splines 89a of clutch member 89 mounted on input shaft 88. Under such conditions, torque will be transmitted from output shaft 75, through clutch assembly 65 to input shaft 88. To place the clutch assembly in the lock or right turn position, the assembly is shifted to the right relative to FIG. 7 so that splines 112 disengage splines 79a and rest on land 81, and splines 113 engage both splines 89a and 91a. Under such conditions, there will be no torque transmission between output shaft 75 and clutch assembly 65 and input shaft 88 will be locked to the frame of the machine. To place the assembly in the free wheel position, the assembly is shifted to the left relative to FIG. 7 so that splines 112 disengage splines 79a and rest on land 80 and splines 113 continue to engage splines 89a. Under such conditions, there will be no torque transmission between output shaft 75 and clutch assembly 65 and drive sprockets 51 and 53 will be able to rotate independently of each other, assuming brake 70 is not set and clutch 64 is in the drive position. Clutch member 110 is provided with an annular recess 114 in which there is mounted a shifting collar 115.

Referring to FIG. 6, shifting assembly 66 consists of a lever mechanism 116 and a fluid actuated cylinder assembly 117. As best shown in FIGS. 4 and 6, lever mechanism 116 includes a transversely disposed support shaft 118 pivotally mounted on a bracket 119 mounted on housing wall 76, and a pair of levers 120 and 121 rigidly mounted on support member 118. Lever 120 includes an arm portion 120a provided with a recess 122 which receives pin 108a of shifting collar 108 therein, and an arm portion 120b. Lever 121 is disposed in transverse alignment with lever arm portion 120a and is provided with a recess 123 in the end thereof which receives a collar pin 108b therein. Cylinder assembly 117 is of a conventional construction including a cylinder 124 pivotally connected to a bracket 125 rigidly mounted on housing wall 76 above bracket 119, and a rod 126 pivotally connected at the end thereof to the outer end of lever arm portion 120b. The opposite ends of cylinder 124 are connected to a source of fluid under pressure on the machine provided with suitable valving to effect the extension and retraction of rod 126. As rod 126 is extended and retracted, lever mechanism 116 will engage collar pins 108a and 108b of collar 108 to displace clutch 64 axially thus positioning the clutch in the drive and lock positions as previously described. The rod as illustrated in FIG. 6 is in the extended position corresponding to the lock position of clutch assembly 64. When the rod is retracted, the clutch will be in the drive position as illustrated in FIG. 7.

Shifting assembly 67 is best illustrated in FIGS. 5 and 6 and consists of a lever mechanism 127, a fluid actuated cylinder assembly 128 and a second fluid actuated cylinder assembly 129. Referring to FIG. 5, lever mechanism 127 includes a transversely disposed support shaft 130 pivotally mounted on a bracket 131 rigidly mounted on housing side wall 77, a lever 132 mounted on one end of support shaft 130 and a lever 133 mounted on the opposite end of support shaft 130. Lever 132 is provided with an arm portion 132a having a slot 134 formed on the end thereof which receives a collar pin 115a therein, and an arm portion 132b. Lever 133 is disposed in alignment with arm portion 132a and is provided with a slot 135 in the end thereof which receives a collar pin 115b therein.

Cylinder assembly 128 includes a cylinder 136 pivotally mounted on a bracket 137 mounted on housing side wall 77 and a rod 138 pivotally connected to lever arm portion 132b. Cylinder 136 is connected to a source of fluid under pressure having suitable valving and is operable to extend and retract rod 138 to position shifting collar 115 in the positions designated by the letters FW, D and L in FIG. 6, corresponding to the free wheel, drive and lock positions of clutch assembly 65 as previously described. Cylinder assembly 129 functions to selectively restrict the pivotal movement of lever mechanism 132 and, correspondingly, the travel of shifting collar 115 between positions D and L. The assembly consists of a cylinder 139 pivotally mounted on bracket 37 and a rod 140 having a detent 141 rigidly secured to the free end thereof. The detent is provided with an elongated slot 142 which receives therein a pin 143 rigidly secured to lever arm portion 132b.

When rod 140 of cylinder assembly 139 is in the extended position as shown by the phantom lines in FIG. 6, cylinder assembly 136 may be operated to shift lever 132 between drive position D and lock position L. The pivotal movement of lever mechanism 132 is restricted between such operating positions by the engagement of pin 143 with the ends of slot 142 of detent 141. When the piston end of cylinder 139 is connected to tank, cylinder assembly 128 may be operated to position lever mechanism 132 in the free wheel position FW as illustrated by the solid lines in FIG. 6, intermediate drive position D or lock position L as illustrated by the phantom lines in FIG. 6. It thus will be appreciated that when fluid under pressure is supplied to the piston end of cylinder 139 to extend rod 140, travel of lever mechanism 132 will be restricted between drive position D and lock position L and the machine will be prevented from moving into a free wheel condition until the piston end of cylinder 139 is connected to tank, rod 140 is released and lever mechanism 132 is permitted to pivot to the free wheel position.

When the machine is non-operational, motor brake 70 is normally set, the rods of cylinder assemblies 94 are extended to urge locking lugs 92 into engagement with sprockets 51 and 53, rod 140 of cylinder assembly 129 is extended to restrict the travel of shifting lever mechanism 132 between the drive and lock positions, rod 126 of cylinder assembly 117 is retracted to position shifting lever mechanism 116 in the drive position and rod 138 of fluid cylinder 128 is partially extended to position shifting lever mechanism 132 to the drive position. Under such conditions, the application of the motor brake and the engagement of the locking lugs with the sprocket will prevent movement of the machine. When it is desired to propel the machine, initially, brake 70 is released and suitable controls are operated to supply fluid under pressure to the rod ends of cylinders 102 of cylinder assemblies 94 to retract the rods thereof and, correspondingly, disengage locking lugs 92 from sprockets 51 and 53. With the shifting lever mechanisms in the drive positions as described, clutch assemblies 64 and 65 will be in the positions as illustrated in FIG. 7 whereby torque will be transmitted from gear box output shaft 75 through clutch assemblies 64 and 65 to final gear reduction input shafts 83 and 88 to drive sprockets 51 and 53. Under such conditions, the machine will be propelled forwardly or rearwardly depending on the direction of drive. When it is desired to steer to the right, rod 138 of cylinder assembly 128 is extended fully to move shifting lever mechanism 132 to the lock position as illustrated by the phantom lines in FIG. 6. Correspondingly, clutch mechanism 65 will be displaced to the right relative to FIG. 7 so that splines 113 of the clutch assembly engage both splines 89a and 91a, and splines 112 of the clutch assembly disengage with splines 79a of clutch member 79. Under such circumstances, drive sprocket 53 will be disengaged from the drive motor and locked to crawler frame section 50 and torque will continue to be transmitted to drive sprocket 51 to pivot or turn the machine about locked sprocket 53. When it is desired to steer to the left, rod 138 of cylinder assembly 128 is retracted to the intermediate position to again position clutch assembly 65 as shown in FIG. 7, and rod 126 of cylinder assembly 117 is extended to position shifting lever mechanism 126 to the position as shown by the solid lines in FIG. 6 and correspondingly shift clutch 64 to the left relative to FIG. 7 so that splines 104 of clutch member 64 disengage with splines 78a and splines 105 of the clutch member engage both splines 84a and 86a. Under such conditions, sprocket 51 will be disengaged from the drive train and locked to crawler frame section 49, drive will be transmitted through clutch assembly 65 to drive sprocket 53 and the machine will pivot or turn to the left about locked sprocket 51. It will be appreciated that during the non-operational, propelling and steering modes of the machine, due to the position of detent 141, the machine will be prevented from shifting to a free wheel condition. Furthermore, it will be noted that when the machine shifts from the propel mode to a steering mode, neither of clutches 64 or 65 disengage from the drive train of the machine until the clutches are locked to the crawler frame sections. Such feature eliminates the requirement for an interlock between the clutches.

When it is desired to place the machine in the digging mode, suitable controls are operated to supply fluid under pressure to the piston ends of cylinders 102 of cylinder assemblies 94 to urge locking lugs 92 into locking engagement with drive sprockets 51 and 53. Simultaneously, fluid cylinder assembly 17 is operated to shift clutch 64 to the drive position and fluid cylinder assembly 128 is operated to bias shifting lever mechanism 132 to the free wheel position. The pivotal movement of lever mechanism 132 to the free wheel position is prevented however by detent 141 so long as rod 140 of cylinder assembly 129 is in its normally extended position. Rod 140 will remain in its extended position until such time that one of the locking lugs 92 engages a drive sprocket as illustrated in FIG. 8. Under such circumstances, a laterally projecting portion 103a of the pin connecting the free end of rod 103 to link 97 will engage and trip an actuating arm 144 to close a micro switch 145 mounted on support member 101 on the crawler frame section. The closing of micro switch 145 closes an electrical circuit energizing a solenoid operating a valve in the fluid supply circuit of cylinder assembly 129, communicating the piston end of cylinder 139 with tank. With the piston end of cylinder 139 being disengaged from line pressure, rod 140 is free to retract thus permitting shifting lever mechanism 132 to shift to the free wheel position. Such shifting action will cause clutch assembly 165 to move to the extreme left position relative to FIG. 7 wherein splines 113 will still be in engagement with splines 89a but splines 112 will be out of engagement with splines 79a. Under such conditions, either of drive sprockets 51 and 53 will be capable of rotating or free wheeling relative to the other locked sprocket to permit the free wheeling sprocket to rotate and become engaged with its cooperating locking lug. It will be noted that detent 141 will be released whenever either of locking lugs 92 engages its cooperating socket and functions to trip the associated micro switch. Normally, when one of the locking lugs is engaged, and the machine commences digging, the crowd or hoist action of the machine will jar the machine sufficiently to cause the free wheeling sprocket to rotate so that the cooperating locking lug will become aligned with a recess in the sprocket.

When it is desired to propel the machine again, cylinder assemblies 94 are operated to retract their rods and correspondingly disengage the locking lugs from the drive sprockets, cylinder assembly 117 is operated to place clutch 64 in the drive or lock position and cylinder assembly 128 is operated to place clutch assembly 65 in the drive or lock position. With the opening of the micro switches, the piston end of cylinder 139 again will be connected to line pressure to extend rod 140 and position detent 141 so that shifting lever mechanism 132 is restricted to shifting between the drive and lock positions.

With the system as described, the machine can never be in the totally free wheel condition. Either one of the drive sprockets will be locked by a locking lug or the drive sprockets will be drivingly engaged to the motor. Such arrangement eliminates the potential hazards of a free wheeling machine which could otherwise result in damage to the machine and other property or injury to operating personnel.

From the foregoing detailed description, it will be evident that there are a number of changes, adaptations and modifications of the present invention which come within the province of those persons having ordinary skill in the art. However, it is intended that all such variations not departing from the spirit of the invention be considered as within the scope thereof and as limited solely by the appended claims.

I claim:

1. In a machine having a frame, a pair of crawler treads mounted on said frame and drive sprockets journaled in said frame and drivingly engaged with said crawler treads, a crawler drive system comprising drive means mounted on said frame, a first clutch movable between a drive position for transmitting drive from said drive means to a first of said drive sprockets and a lock position for locking said first drive sprocket to said frame, a second clutch movable between a non-drive position for permitting a second of said drive sprockets to free wheel, a drive position for transmitting drive from said drive means to said second drive sprocket and a lock position for locking said second drive sprocket to said frame, a first means for locking said first drive sprocket to said frame, a second means for locking said second drive sprocket to said frame, means for selectively engaging said first and second locking means with said first and second drive sprockets, respectively, means for shifting said first clutch between the drive and lock positions thereof, means for shifting said second clutch between the non-drive, drive and lock positions thereof, and means releasable responsive to engagement on one of said first and second drive sprocket locking means for preventing said second clutch from shifting to said non-drive position.

2. A crawler drive system according to claim 1 including means for braking said drive means.

3. A crawler drive system according to claim 1 wherein said first clutch comprises an axially shiftable shaft having a first set of splines engageable with splines provided on an input shaft drivingly engageable with said first drive sprocket when said shaft is in the drive position and engageable with splines provided on said input shaft and splines provided on said frame when said shaft is in the lock position, and a second set of splines engageable with splines provided on an output shaft drivingly engageable with said drive means when said clutch shaft is in the drive position and disengageable with said output shaft splines when said clutch shaft is in the lock position.

4. A crawler drive system according to claim 3 wherein said means for shifting said first clutch comprises a fluid cylinder actuated shifting lever.

5. A crawler drive system according to claim 1 wherein said second clutch comprises an axially shiftable shaft having a first set of splines engageable with splines provided on an input shaft drivingly engageable with said second drive sprocket when said clutch shaft is in the non-drive and drive positions and engageable with said input shaft splines and splines provided on said frame when said shaft is in the lock position, and a second set of splines engageable with splines provided on an output shaft drivingly engageable with said drive means when said clutch shaft is in the drive position and disengageable with said output shaft splines when said clutch shaft is in the non-drive and lock positions.

6. A crawler drive system according to claim 5 including means for braking said drive means.

7. A crawler drive system according to claim 5 wherein said means for shifting said second clutch comprises a fluid cylinder actuating shifting lever.

8. A crawler drive system according to claim 7 wherein said means releasable responsive to engagement of one of said first and second drive sprocket locking means for preventing said second clutch from shifting to said non-drive position includes an abutment member engageable by said shifting lever for preventing said shifting lever from shifting to a non-drive position, releasable upon the engagement of either of said sprocket locking means.

9. A crawler drive system according to claim 1 wherein each of said sprocket locking means comprises a fluid cylinder actuated lug receivable within a recess in a cooperating drive sprocket.

10. A crawler drive assembly according to claim 8 wherein said second clutch shifting means includes a fluid cylinder actuated shifting lever wherein said means releasable responsive to engagement of one of said drive sprocket locking locks includes said detent means engageable by said shifting lever for preventing said shifting lever from shifting to said non-drive position, a fluid cylinder having a rod biasing said detent means into a position engageable by said shifting lever to prevent the shifting lever from shifting to the non-drive position when fluid under pressure is supplied to said fluid cylinder, means for supplying fluid under pressure to said fluid cylinder and microswitch means operable by one of said drive sprocket locking lugs when said lug is received in a recess of a cooperating drive sprocket for operating said means for supplying fluid.

11. A crawler drive system according to claim 8 wherein said means releasable responsive to engagement of one of said first and second drive sprocket locking means includes a detent operatively engageable with said shifting lever, shiftable by a fluid actuated cylinder.

12. A crawler drive system according to claim 11 wherein said detent is provided with a slot and said shifting lever includes a pin received within said slot and displaceable along the length thereof for restricting the pivotal movement of said shifting lever.

13. A crawler drive assembly according to claim 12 wherein said fluid cylinder is operable to position said detent in a position restricting said second clutch shaft to shift between said drive and lock positions.

14. A crawler drive system according to claim 14 wherein said detent is mounted on the rod of the fluid cylinder thereof, said rod is extendable to position said detent in said restricting position, including means for supplying fluid under pressure to said fluid cylinder for extending the rod thereof and positioning said detent in said restricting position, and including means responsive to the engagement of one of said locking lugs with its cooperating drive sprocket for removing said supply of fluid under pressure to said fluid cylinder, thereby releasing said detent and permitting said shifting lever to shift said second clutch shaft to said non-drive position.

15. In a machine having a frame, a pair of crawlers treads mounted on said frame and first and second drive sprockets journaled in said frame and drivingly engaged with said crawler treads, a crawler drive system comprising drive transmitting means drivingly interconnecting said first and second sprockets, drive means mounted on said frame and drivingly connected to said drive transmitting means, said drive transmitting means including a first clutch disposed between said drive means and said first drive sprocket movable between a drive position for transmitting drive from said drive means to said first drive sprocket and a lock position for locking said first drive sprocket to said frame, said drive transmitting means including a second clutch disposed between said drive means and said second drive sprocket movable between a non-drive position for permitting one of said sprockets to free wheel relative to the other thereof, a drive position for transmitting drive from said drive means to said second drive sprocket and a lock position for locking said second drive sprocket to said frame, a first means for locking said first drive sprocket to said frame, a second means for locking said second drive sprocket to said frame, means for selectively engaging said first and second means with said first and second drive sprockets, respectively, means for shifting said first clutch between said drive and lock positions, means for shifting said second clutch between said free wheel, drive and lock positions thereof, and means releasable responsive to engagement of one of said first and second drive sprocket locking means for preventing said second clutch from shifting to said non-drive position.

16. A crawler drive system according to claim 16 including means for braking said drive means.